July 17, 1962 R. E. HIGLEY 3,044,150
WINDING OF STATOR COILS
Filed Jan. 10, 1958

WITNESSES
John C. Headley, Jr.
E. Herbert Liss

INVENTOR
Robert E. Higley
BY
ATTORNEY

United States Patent Office 3,044,150
Patented July 17, 1962

3,044,150
WINDING OF STATOR COILS
Robert E. Higley, Clarence, N.Y., assignor to Westinghouse Electric Corporation, East Pittsburgh, Pa., a corporation of Pennsylvania
Filed Jan. 10, 1958, Ser. No. 708,175
2 Claims. (Cl. 29—155.5)

The present invention relates to improvement in stator windings of dynamoelectric machines and more particularly to an improved stator winding for a polyphase alternating current generator and to a method of winding a polyphase stator for an alternating current generator.

In the older, prevailing type of stator coil windings for dynamoelectric machines of the type herein illustrated the manner of forming these windings has resulted in a number of disadvantageous features of coil construction and operation, which in many instances, has caused considerable trouble in the design, manufacture and operation of electrical machines in which these coils are utilized. For example, in prior art machines, the coils for each group are individually wound. The coils generally consist of a number of coil turns. These multiple turn coils are customarily wound in a manner resulting in a high voltage between turns. It is, therefore, advantageous to provide a single turn coil. In the manufacture of a multiple coil, it is common practice to provide series connections between the several coil groups. The difference of potential and the potential stresses occurring at the individual series connections is normally very high being in the neighborhood of ⅓ to ⅔ of the full terminal voltage of the coil. The customary method of making individual connections in a machine of the size contemplated in the present invention, by way of example, would require 36 coil-to-coil connections, and 72 group-to-group connections. If one-turn coils are utilized, the connections would be extremely bulky so that the total end extensions both axially and radially would be excessive, thereby requiring a larger stator frame of large inside diameter as well as a longer frame. Although this problem is most apparent in a one-turn coil, it will be obvious that elimination of the separate connections is very advantageous when multiple turn coils are utilized.

It has been difficult to overcome these problems particularly in a polyphase machine where sequential winding of the phase coil groups is required.

It is therefore an object of this invention to provide an improved stator coil winding structure and manner of winding for dynamoelectric machines.

Another object of this invention is to provide an improved structure in manner of winding for stator coils in a dynamoelectric machine which utilizes a continuous winding obviating the need for individual coil-to-coil and group-to-group connection.

A further object of this invention is to provide an improved structure and manner of winding for stator coils in a polyphase dynamoelectric machine which utilizes a continuous sequential winding obviating the need for individual coil-to-coil and group-to-group connections resulting in a contact coil winding.

Further objects and advantages will be apparent from the folowing detailed description taken in connection with the accompanying drawings in which.

Figure 2:
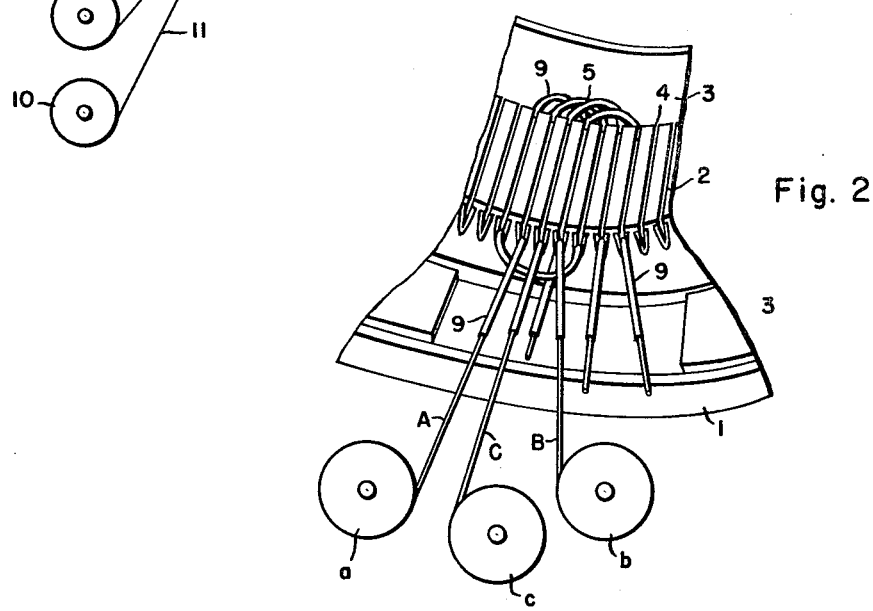
FIGURE 2 is a perspective view of a generator armature winding coil and frame construction partly broken away to show the method of winding the coil of this invention with one coil grouping shown in this position.
Figure 3:
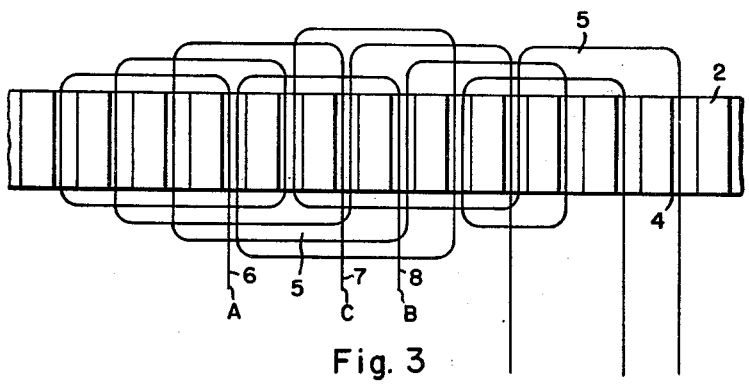
FIGURE 3 is a developed view of a portion of the winding of this invention.

Referring to FIG. 2 the improved dynamoelectric machine construction is shown as applied to a three-phase alternating current generator having a stationary frame 1 in which a core 2 of magnetic material is assembled and retained in position between end rings 3. The core 2 is formed with axially extending winding slots 4 of the partially closed type in which a winding 5 is arranged.

The winding consists of a plurality of coil groupings 5 each including phase groups A, B and C. FIG. 2 illustrates the first group of phase A and B wound and part of the phase group of phase C. The groupings 5 are wound sequentially using phase A, reel $a$; phase C, reel $c$ and phase B, reel $b$ in that order. The coils are maintained connected to the reels $a$, $b$, and $c$. The next adjacent coil grouping 5 is then wound in the same sequence. This manner of winding may be continued until the entire core is wound. A length of wire is left at each end of each phase for terminal connections, as for example, at 6, 7 and 8. Under certain circumstances, it may be desirable to wind only half of the stator. If this is done, the manner of winding the first half of this stator will be repeated for the second half. Thus, two additional terminal leads will be provided for each phase. This may be desirable for control purposes. The sleeves 9 are provided to cover the end turns. As the coil is wound, the operator will position these sleeves 9 around each end turn.

Figure 1:
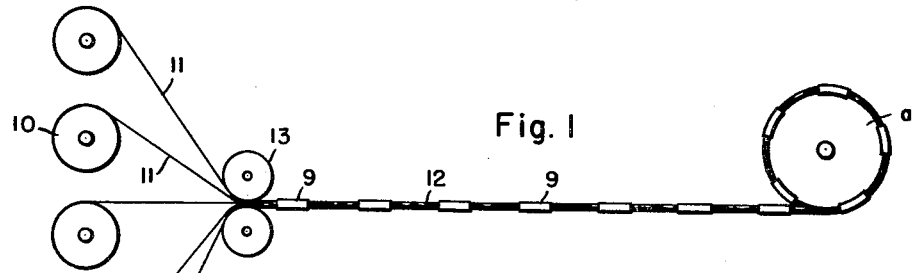
FIGURE 1 shows the system of reel utilized in winding the coil of the invention.

The coils are wound with stranded conductors 12. Each conductor in the illustrated embodiment contains five strands. It will, of course, be understood that any number of strands may be employed. The reels A, B and C are prepared as shown in FIG. 1. Strands 11 of conductor are pulled from reels 10 through rollers 13 to form a single conductor 12. The strands are bound together by sleeves 9 prior to rolling on reel $a$. A sufficient number of sleeves 9 are placed on conductor 12 to provide end turn protectors for the stator coils to be wound from that reel. Reels A, B and C are all prepared in this manner and then placed in position to wind the machine as shown in FIG. 2. This method of preparing the conductor 12 is shown by way of example and it will be apparent that any suitable method may be employed to prepare reels A, B and C as a conductor.

It should now be apparent that an improved structure and method of winding a three-phase stator for a dynamoelectric machine has been provided which will obviate the need for a large number of coil-to-coil and group-to-group connections with the above-mentioned disadvantages, and which results in a more compact and efficient coil winding which is more economical and simpler to manufacture.

It is to be understood that although a specific embodiment of the invention has been described above, it is not limited to the exact arrangements shown but in its broadest aspects it improves all equivalent embodiments and modifications which come within the scope of the invention.

I claim as my invention:

1. The method of winding a continuous, sequentially wound three phase stator including plurality of series connected, continuous coil groups for each phase which comprises winding from first, second and third reels sequentially, a coil group for each phase so as to complete one complete coil grouping, thence winding successively from each of said first, second and third reels the next adjacent coil group for each phase in sequence and continuing to wind said coil groups in sequence until the entire stator is wound with coil groupings, each phase being wound from a continuous, uninterrupted length of wire.

2. The method of winding a slotted core for a polyphase dynamoelectric machine which includes winding a first coil group in selected slots of said core from a first length of wire, winding a second coil group from a second length of wire, winding successive coil groups from successive lengths of wire until a coil group for each phase has been wound to form a coil grouping, thence winding in the same sequence coil groups for each phase to form successive coil groupings until a portion comprising at least a plurality of coil groupings has been wound, each phase being wound from a continuous uninterrupted length of wire.

References Cited in the file of this patent
UNITED STATES PATENTS

| | | |
|---|---|---|
| 1,929,513 | Peele | Oct. 10, 1933 |
| 2,783,403 | Schumaier | Feb. 26, 1957 |